May 8, 1951  J. A. DANIELSON  2,552,154
VALVE-SPOUT CREAM REMOVER
Filed Dec. 4, 1945
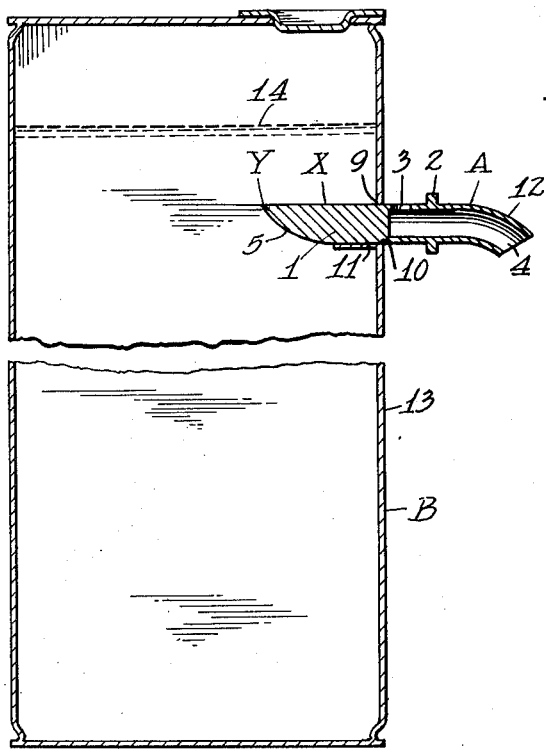
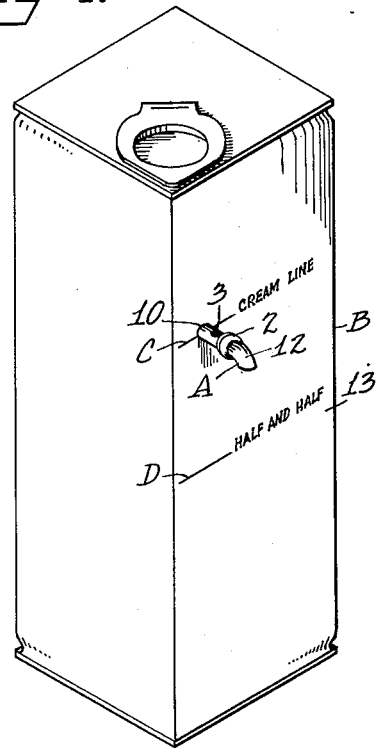
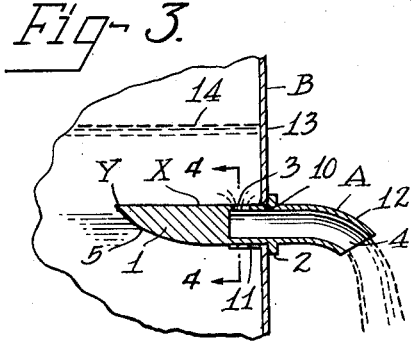
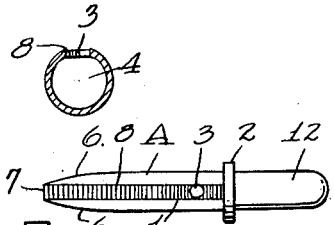
INVENTOR
JOHN A. DANIELSON
BY Munn, Liddy & Glaccum
ATTORNEYS Patented May 8, 1951

2,552,154

UNITED STATES PATENT OFFICE 2,552,154

VALVE-SPOUT CREAM REMOVER

John A. Danielson, Richmond, Calif.

Application December 4, 1945, Serial No. 632,756

1 Claim. (Cl. 222—81)

An object of my invention is to provide a valve-spout cream remover which is in one piece and has a sharp end for puncturing a milk carton at the cream line or at any other desired position for draining the liquid down to the position of the device. Novel means is provided for acting as a valve for shutting off the flow of fluid from the carton at any time desired. Although the device punctures the carton, the rim of the opening made by the puncturing operation makes a liquid tight seal so there will be no leakage.

The device is extremely simple in construction and may be used for dispensing liquids other than cream or milk.

Other objects and advantages will appear in the following specification, and the novel features of the device will be particularly pointed out in the appended claim.

My invention is illustrated in the accompanying drawings forming a part of this application, in which:

Figure 1 is an isometric view of a milk carton showing my device operatively applied thereto;

Figure 2 is a vertical section through the device and through the milk carton and shows the device in closed position so as to prevent any liquid from passing therethrough;

Figure 3 is a view similar to Figure 2 and shows the device in pouring position;

Figure 4 is a transverse section taken substantially along the line 4—4 of Figure 5; and Figure 5 is a top plan view of the device.

While I have shown only the preferred form of my invention, it should be understood that various changes or modifications may be made within the scope of the appended claim without departing from the spirit and scope of the invention.

In carrying out my invention, I provide a valve-spout cream remover indicated generally at A and the device comprises a body member 1 made from any material desired that can be washed in hot water after use without deteriorating. The body may be made of plastic or metal and it may be transparent or opaque. In the present form of the device, I have used a plastic transparent material.

The main portion of the body is cylindrical in shape and the cylindrical portion extends from a flange 2 to a point X which lies an appreciable distance beyond an inlet opening 3 that leads into the hollow interior 4 of the body. From the point X to the puncturing end Y of the body, the undersurface is curved upwardly as shown at 5 in Figure 2, and also the sides of the body are curved inwardly toward each other as at 6—6 shown in Figure 5. The inwardly curved sides and the upwardly curved undersurface can merge into a pointed end not shown, or they can merge into a chisel-like cutting edge shown at 7, the width of the chisel edge being substantially equal to the diameter of the inlet opening 3. The hollow portion 4 of the body can extend on into the pointed puncturing end, but for sanitary reasons it is advisable to terminate the bore 4 at the opening 3, so that the bore and opening can be thoroughly washed after each use.

As already stated, the body portion is cylindrical between the flange 2 and the point X, but in Figures 4 and 5 I show the upper surface 8 of the body, lying between the flange 2 and the end Y, as being flattened and this flat surface has a width substantially equal to the diameter of the opening 3 and the surface extending from the flange 2 to the chisel-shaped end 7. The purpose of the flat surface 8 is to adapt the chisel end of the spout to puncture a milk carton B with a cut equal to the width of the inlet opening 3. The straight incision thus formed provides a flat edge 9 for the opening 10.

The spout after puncturing the container may be moved into it and the flat upper edge portion 9 of the opening will not be subjected to undue strain as the valve is moved from non-pouring position, shown in Figure 2, into pouring position, shown in Figure 3. Since the chisel end 7 initially makes a cut in the carton wall substantially equal to the diameter of the opening 3, the forming of the opening 10 in the carton wall will not enlarge the length of the initial incision 9 because the width of the flat surface 8 is equal to the width of the chisel and therefore the spout will make a leak-proof joint with the carton wall.

Figure 2 shows how the under curved portion 5 of the body will cut and deflect a flap 11 downwardly, the flap being formed by the insertion of the spout into the carton wall. No flap will be formed at the top flat portion 9 of the opening 10. The flap cannot therefore interfere with the inlet opening 3 and the moving of the spout inwardly to start the liquid to flowing and then outwardly to act as a valve for cutting off the flow of liquid will not enlarge the carton wall opening 10. It is possible to insert the spout at the cream line indicated at C in Figure 1, or to insert the spout in any other point on the carton, such as at the half-and-half line shown at D in the same figure. The pouring end of the spout is indicated at 12 and extends outwardly from the flange 2. This pouring end may be straight or it may be curved downwardly as shown in the drawing. The bore 4 should be larger in diameter than the opening 3 so that the cream or other fluid entering the opening will not be impeded in its flow through the bore.

From the foregoing description of the various parts of the device, the operation thereof may be readily understood.

The spout is placed at the desired point on the carton B and then the chisel end 7 is forced into the carton, this movement initially forming the straight line incision 9 and subsequently the entire opening 10. The complete opening 10 is made before the inlet opening 3 of the spout reaches the carton wall 13. The flap 11 will be formed at the bottom of the valve-spout as shown.

After the valve spout has been moved as far as that indicated in Figure 2, it has completed the forming of the opening 10 in the carton wall and is ready for further inward movement for delivering the cream contents 14 from the carton. A receptacle not shown is now placed beside the carton wall 13 and the spout moved inwardly until the flange 2 contacts with the wall 13. This brings the inlet opening 3 within the carton and the fluid in the carton disposed above the opening will gravitate thereinto and pass out through the bore 4 and into the receptacle. If for any reason it is desired to stop the flow of liquid before the level reaches the opening 3, it is merely necessary to grasp the pouring end 12 or the flange 2 and withdraw the valve spout from the container a distance sufficient to move the opening 3 to a position on the exterior side of the carton wall 13. The valve spout now acts as a valve and will stop any further flow of fluid. The spout may remain in this position as long as desired and will prevent any leakage occurring around the opening 10. The valve spout can be again moved into pouring position by merely moving it inwardly so that the flange 2 again abuts the carton wall 13.

The device is extremely simple in construction since it consists of only a single piece and it will have a long and useful life because it can be thoroughly cleaned after each use. The purpose of the flat top 8 is to prevent any part of the punctured wall portion from interfering with the flow of the liquid into the inlet opening 3. Also no portion of the flap can enter the inlet opening to obstruct it.

I claim:

A valve-spout cream remover comprising an elongated cylindrical body having a puncturing end portion and a pouring end portion, said pouring end portion consisting of a hollow tube with an outer open end and having an inlet opening in the wall of said tube between the body ends, a stop for limiting inward movement of the cream remover, said stop being carried by the pouring end portion and spaced from the inlet opening at least the thickness of the carton wall which is to be punctured by the device, the body having a flat surface extending from the stop to the puncturing end, said body having a longitudinally curved portion disposed on the opposite side of the body from the flat surface, said curved portion extending from the puncturing end and merging into the outer cylindrical surface of the body before a point in the body is reached that is diametrically opposite the inlet opening, whereby the body will have the same external contour from the stop to a predetermined distance on the other side of the inlet opening from the stop so that this contour portion will prevent leakage through the punctured carton opening whether the cream remover is in the open-valve position with the inlet opening disposed within the carton or in the closed-valve position with the inlet opening withdrawn to a position outside of the carton wall.

JOHN A. DANIELSON.

REFERENCES CITED

The following references are of record in the file of this patent:

UNITED STATES PATENTS

| Number | Name | Date |
|---|---|---|
| 1,431,860 | Zurbrigg | Oct. 10, 1922 |
| 1,745,382 | Rogers | Feb. 4, 1930 |
| 2,218,285 | Jellik | Oct. 15, 1940 |

FOREIGN PATENTS

| Number | Country | Date |
|---|---|---|
| 394,520 | Germany | Apr. 24, 1924 |